US012560997B2

(12) United States Patent
Sengelaub et al.

(10) Patent No.: US 12,560,997 B2
(45) Date of Patent: Feb. 24, 2026

(54) STRAY LIGHT MITIGATION IN OPTICAL SYSTEMS

(71) Applicant: Apple Inc., Cupertino, CA (US)

(72) Inventors: Tom Sengelaub, Sunnyvale, CA (US); Emanuele Mandelli, Mountain View, CA (US); Aleksandr M Movshovich, Santa Clara, CA (US); Martin Haller, Mountain View, CA (US); Hao Qin, Mountain View, CA (US); Hua Gao, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 193 days.

(21) Appl. No.: 18/145,828

(22) Filed: Dec. 22, 2022

(65) Prior Publication Data

US 2023/0315201 A1 Oct. 5, 2023

Related U.S. Application Data

(63) Continuation of application No. 18/002,649, filed as application No. PCT/US2021/039685 on Jun. 29, 2021, now abandoned.

(Continued)

(51) Int. Cl.
*G06V 10/141* (2022.01)
*G02B 27/01* (2006.01)
(Continued)

(52) U.S. Cl.
CPC ......... *G06F 3/013* (2013.01); *G02B 27/0172* (2013.01); *G06T 5/50* (2013.01);
(Continued)

(58) Field of Classification Search
CPC ............ G06F 3/013; G06F 3/01; G06F 3/038; G06V 10/141; G06V 10/60; G02B 27/0172; G06T 5/50; G06T 2207/20221
See application file for complete search history.

(56) References Cited

U.S. PATENT DOCUMENTS

2013/0293842 A1* 11/2013 Grenon .............. G01B 11/0625
359/584
2018/0039846 A1* 2/2018 Grubb .................... G06N 20/00
2020/0166994 A1* 5/2020 Tornéus ................. G06F 3/038

OTHER PUBLICATIONS

International Search Report and Written Opinion for PCT/US2021/039685, filed Jun. 29, 2021, pp. 1-14.

(Continued)

*Primary Examiner* — Michael A Faragalla
(74) *Attorney, Agent, or Firm* — Robert C. Kowert; Kowert, Hood, Munyon, Rankin & Goetzel, P.C.

(57) ABSTRACT

Methods and apparatus for stray light mitigation in optical systems that include two or more illumination sources (e.g., point light sources such as light-emitting diodes (LEDs)) that illuminate an object to be imaged, and a camera configured to capture images of light from the point light sources reflected by the object when illuminated. To mitigate "occlusions" or artifacts caused by, for example, stray light or reflections of the illumination sources off of other components of the system, multiple images of the object are captured with different groups of the illumination sources enabled. The captured images can then be processed and merged to generate an output image with the occlusions or artifacts caused by stray light or reflections mitigated or eliminated.

20 Claims, 13 Drawing Sheets

Related U.S. Application Data

(60) Provisional application No. 63/046,651, filed on Jun. 30, 2020.

(51) Int. Cl.
| | |
|---|---|
| *G06F 3/01* | (2006.01) |
| *G06T 5/50* | (2006.01) |
| *G06V 10/60* | (2022.01) |

(52) U.S. Cl.
CPC ............ *G06V 10/141* (2022.01); *G06V 10/60* (2022.01); *G06T 2207/20221* (2013.01)

(56) References Cited

OTHER PUBLICATIONS

Extended European Search Report European Patent Application No. 23172414.7 dated Oct. 30, 2023, pp. 1-11.

* cited by examiner start

Capture first image with first group of LEDs enabled and second group of LEDs disabled.
900

Capture second image with first group of LEDs disabled and second group of LEDs enabled.
910

Merge the two images to generate an output image.
920

STRAY LIGHT MITIGATION IN OPTICAL SYSTEMS

This application is a continuation of U.S. patent application Ser. No. 18/002,649, filed Dec. 20, 2022, which is a 371 of PCT Application No. PCT/US2021/039685, filed Jun. 29, 2021, which claims benefit of priority to U.S. Provisional Patent Application No. 63/046,651, filed Jun. 30, 2020. The above applications are incorporated herein by their reference. To the extent that any material in the incorporated application conflicts with material expressly set forth herein, the material expressly set forth herein controls.

BACKGROUND

An eye or gaze tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

SUMMARY

Various embodiments of methods and apparatus for stray light mitigation in optical systems are described. An optical system may include two or more illumination sources (e.g., point light sources such as light-emitting diodes (LEDs)) that illuminate an object to be imaged, and a camera configured to capture images of light from the point light sources reflected by the object when illuminated. To mitigate "occlusions" or artifacts caused by, for example, stray light or reflections of the illumination sources off of other components of the system, multiple images of the object are captured with different groups of the illumination sources enabled. The captured images can then be merged to generate an output image with the occlusions or artifacts caused by stray light or reflections mitigated or eliminated.

In some embodiments, occlusion masks may be generated, for example during a factory calibration process and/or during a startup process for a device that includes the optical system. The masks may be generated from images captured with the optical system with different groups of the illumination sources activated or deactivated and when the object (e.g., eye) is not being imaged. The stray light and reflection artifacts corresponding to the different groups of illuminators (e.g., LEDs) when activated will show in the respective images. These images can then be used to generate occlusion masks corresponding to respective groups of the illumination sources. When capturing images of an object using the optical system, images are captured with the different groups of the illumination sources activated or deactivated. Respective occlusion masks are applied to the captured images, and the masked images are then merged to generate an output image with the occlusions or artifacts caused by stray light or reflections mitigated or eliminated.

As an alternative, in some embodiments, a rolling shutter (RS) sensor may be used in interleave mode to capture a first image containing odd-numbered rows with a first group of illumination sources (e.g., point light sources such as LEDs) enabled and a second group of illumination sources disabled. A second image is captured containing even-numbered rows with the first group of illumination sources disabled and the second group of illumination sources enabled. The two images can then be merged. Glints, stray light reflections, and features of the object appear on alternating rows of the output image.

A non-limiting example application of the methods and apparatus for stray light mitigation are in eye tracking systems that include at least one eye tracking camera (e.g., infrared (IR) cameras) positioned at each side of the user's face, and an illumination source (e.g., point light sources such as an array or ring of IR light-emitting diodes (LEDs)) that emit light towards the user's eyes. The eye tracking system may, for example, be a component of a head-mounted device (HMD), for example a HMD of an extended reality (XR) system such as a mixed or augmented reality (MR) system or virtual reality (VR) system. To mitigate stray light occlusions or artifacts caused by, for example, reflections of the LEDs off of components of the HMD, two images of the eye are captured with different groups of the LEDs enabled. The captured images can then be merged to generate an output image with the occlusions or artifacts caused by stray light mitigated or eliminated. Alternatively, an RS sensor may be used in interleave mode to capture a first image containing odd-numbered rows with a first group of illumination sources enabled and a second group of illumination sources disabled and a second image containing even-numbered rows with the first group of illumination sources disabled and the second group of illumination sources enabled. The two images can then be merged.

Figure 1A:
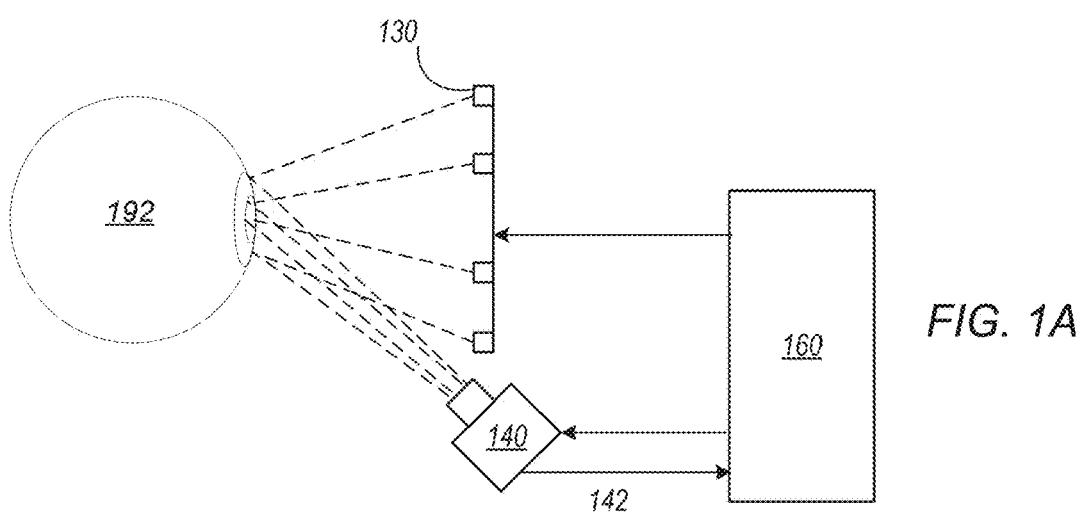
FIGS. 1A through 1C illustrate example eye tracking systems, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for stray light mitigation in optical systems are described. An optical system may include two or more illumination sources (e.g., point light sources such as light-emitting diodes (LEDs)) that illuminate an object to be imaged, and a camera configured to capture images of light from the illumination sources reflected by the object when illuminated. To mitigate stray light "occlusions" or artifacts caused by, for example, reflections of the illumination sources off of other components of the system, multiple images of the object are captured with different groups of the illumination sources enabled. The captured images can then be merged to generate an output image with the occlusions or artifacts caused by stray light mitigated or eliminated.

A non-limiting example application of the methods and apparatus for stray light mitigation are in eye tracking systems that include at least one eye tracking camera (e.g., infrared (IR) cameras) positioned at each side of the user's face, and an illumination source (e.g., point light sources such as an array or ring of IR light-emitting diodes (LEDs)) that emit light towards the user's eyes. The eye tracking system may, for example, be used to compute gaze direction and a visual axis using glints and eye features based on a three-dimensional (3D) geometric model of the eye.

Figure 1B:
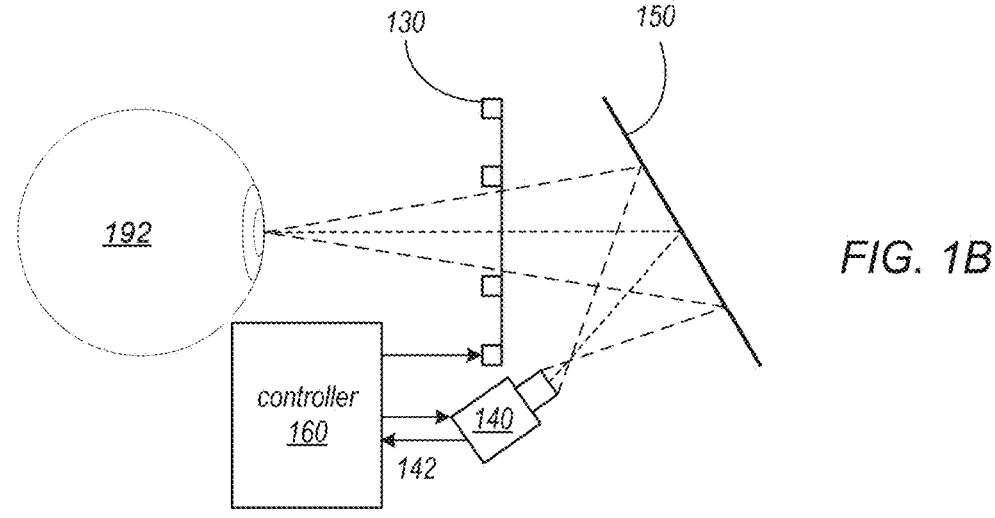
Figure 1C:
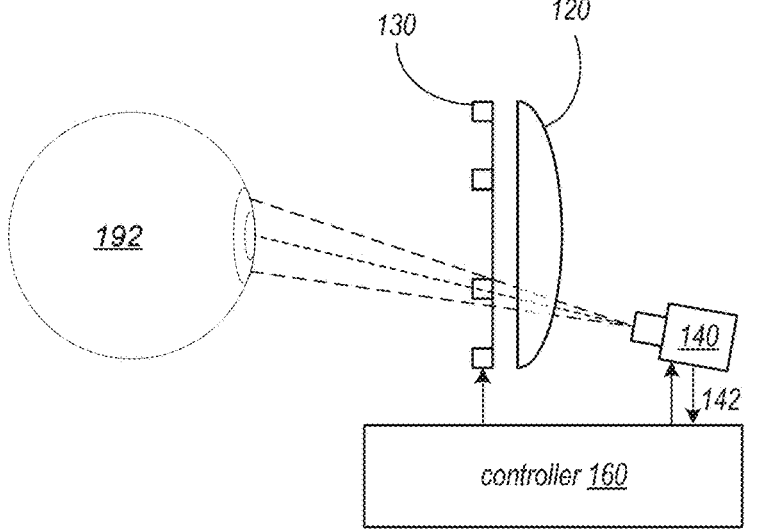

FIGS. 1A through 1C illustrate example eye tracking systems, according to some embodiments. FIG. 1A shows an eye tracking system in which the eye tracking camera 140 images the eye 192 directly. However, in some embodiments the eye tracking camera 140 may instead image a reflection of the eye 192 off of a hot mirror 150 as shown in FIG. 1B. In addition, in some embodiments, the eye tracking camera 140 may image the eye through a lens 120 of an optical system, for example as shown in FIG. 1C.

As illustrated in FIGS. 1A through 1C, a device (e.g., a head-mounted device (HMD)) may include an eye tracking system that includes at least one eye tracking camera 140 (e.g., infrared (IR) cameras) positioned at each side of the user's face, and an illumination source 130 (e.g., point light sources such as an array or ring of IR light-emitting diodes (LEDs)) that emit light towards the user's eyes 192. The eye tracking cameras 140 may be pointed towards the eyes 192 to receive light from the illumination source 130 reflected from the eyes 192, as shown in FIG. 1A. However, in some embodiments the eye tracking cameras 140 may instead image a reflection of the eyes 192 off of a hot mirror 150 as shown in FIG. 1B. In addition, in some embodiments, the eye tracking cameras 140 may image the eyes 192 through lenses 120 of an optical system, for example as shown in FIG. 1C.

The device that includes the eye tracking system may include a controller 160 comprising one or more processors and memory. Controller 160 may include one or more of various types of processors, image signal processors (ISPs), graphics processing units (GPUs), coder/decoders (codecs), and/or other components for processing and rendering video and/or images. As an example, in an HMD of an XR system, the controller 160 may be configured to render mixed or augmented reality (MR) or virtual reality (VR) frames for display. In some embodiments, the controller 160 may be integrated in the device. In some embodiments, at least some of the functionality of the controller 160 may be implemented by an external device coupled to the device by a wired or wireless connection.

The controller 160 may send control signals to the illumination source 130 and camera 140 to control the illumination of the eye 192 and capture of images of the eye 192. The controller 160 may use input 142 (e.g., captured images of the eyes 192) from the eye tracking cameras 140 for various purposes, for example in processing frames for display in an XR system. The controller 160 may implement algorithms that estimate the user's gaze direction based on the input 142. For example, the controller 160 may implement algorithms that process images captured by the cameras 140 to identify glints (reflections of the LEDs 130) obtained from the eye tracking cameras 140. As another example, the controller 160 may implement algorithms that process images captured by the cameras 140 to identify features of the eye 192 (e.g., the pupil, iris, and sclera). The information obtained from the input 142 may, for example, be used to determine the direction in which the user is currently looking (the gaze direction), and may be used to construct or adjust a 3D model of the eye 192.

However, in a device that implements the eye tracking system, components of the device may result in unwanted reflections and stray light on the final image captured by camera 140. As the optical system becomes more complex, for example with optical surfaces (e.g., lenses 120 and/or mirrors 150) involved in the trajectory between the point light sources 130 and camera 140, the higher the likelihood of getting unwanted reflections and stray light on the final image captured by camera 140, for example caused by reflections in lenses, imperfections in lenses or optical surfaces, or dust on optical surfaces.

Figure 2:
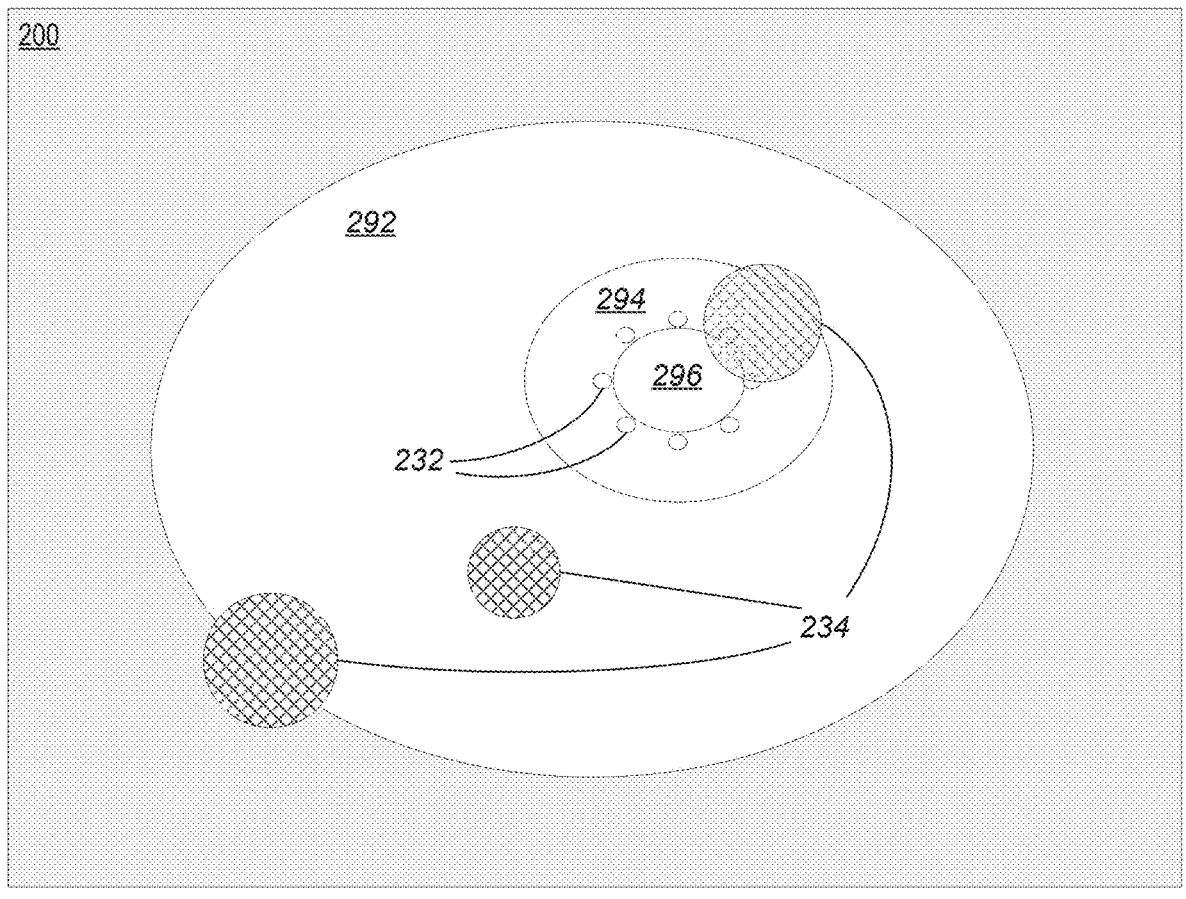
FIG. 2 illustrates an image captured by an eye tracking system that includes occlusions and artifacts caused by reflections or stray light in the optical system, according to some embodiments.

FIG. 2 graphically illustrates an example image 200 captured by an eye tracking system that includes occlusions and artifacts caused by reflections or stray light in the optical system, according to some embodiments. Image 200 shows the eye 292, iris 294, and pupil 296, and also shows reflections 232 of the point light sources (e.g., a ring of eight LEDs) on the eye 292. However, unwanted reflections and stray light have resulted in artifacts 234 on the image. One or more features that are used in the eye tracking algorithms may be occluded by the artifacts 234 (e.g., two of the reflections 232 of the point light sources are at least partially occluded, as shown in FIG. 2). Loss of the occluded features may result in loss of accuracy of the gaze tracking algorithms implemented by the controller 160.

Figure 3A:
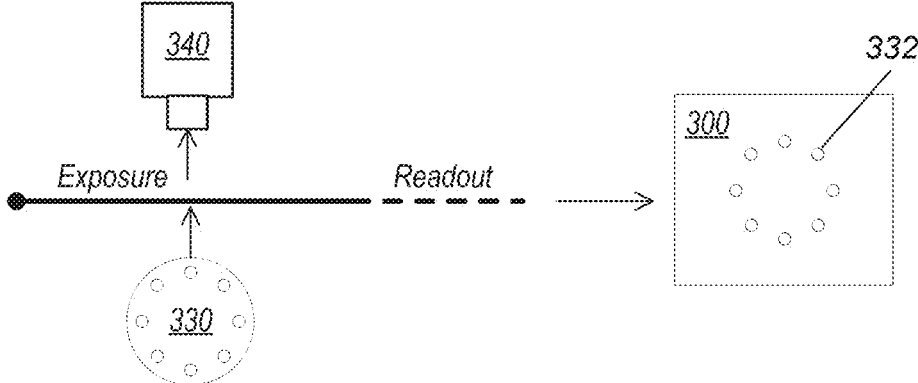
FIG. 3A illustrates capturing an image in an eye tracking system under ideal conditions, according to some embodiments.

FIG. 3A illustrates capturing an image in an eye tracking system under ideal conditions, according to some embodiments. The illumination source 330 (e.g., point light sources such as an array or ring of light-emitting diodes (LEDs)) illuminates the eye, and a sensor of camera 340 captures an image 300 of the eye, during an exposure period. The captured image 300 is read out from the camera 340 sensor during a readout period. The captured image 300 includes reflections (also referred to as glints) 332 of the point light sources (e.g., the ring of eight LEDs).

Figure 3B:
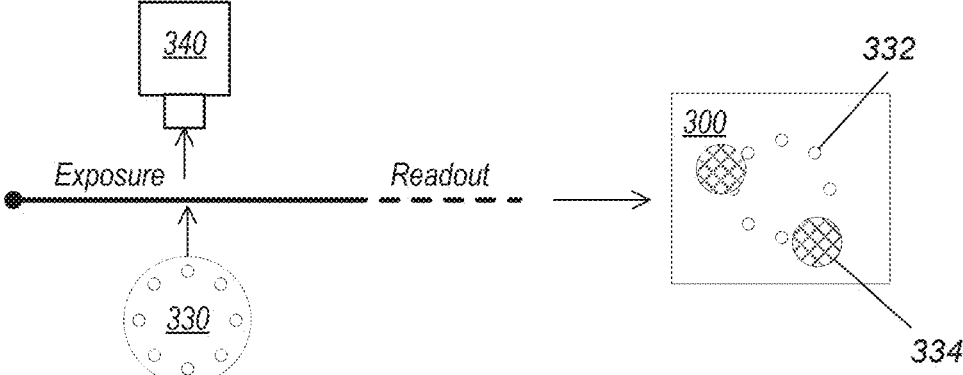
FIG. 3B illustrates occlusions cause by reflections of the illumination sources in an eye tracking system, according to some embodiments.

FIG. 3B illustrates occlusions cause by reflections of the illumination sources in an eye tracking system, according to some embodiments. The illumination source 330 illuminates the eye, and a sensor of camera 340 captures an image 300 of the eye, during an exposure period. The captured image 300 is read out from the camera 340 sensor during a readout period. The captured image 300 includes reflections (also referred to as glints) 332 of the point light sources. However, artifacts 334 resulting from unwanted reflections or stray light occlude some of the glints 332.

Embodiments of methods and apparatus for stray light mitigation in optical systems are described in FIGS. 4 through 11 that may mitigate the artifacts 334 caused by stray light or reflections of the illumination source 330 off of other components of the system. In embodiments, multiple images of the object (e.g., the eye) are captured with different groups of the illumination sources enabled. The captured images can then be merged to generate an output image with the occlusions or artifacts caused by stray light mitigated or eliminated.

Figure 9:
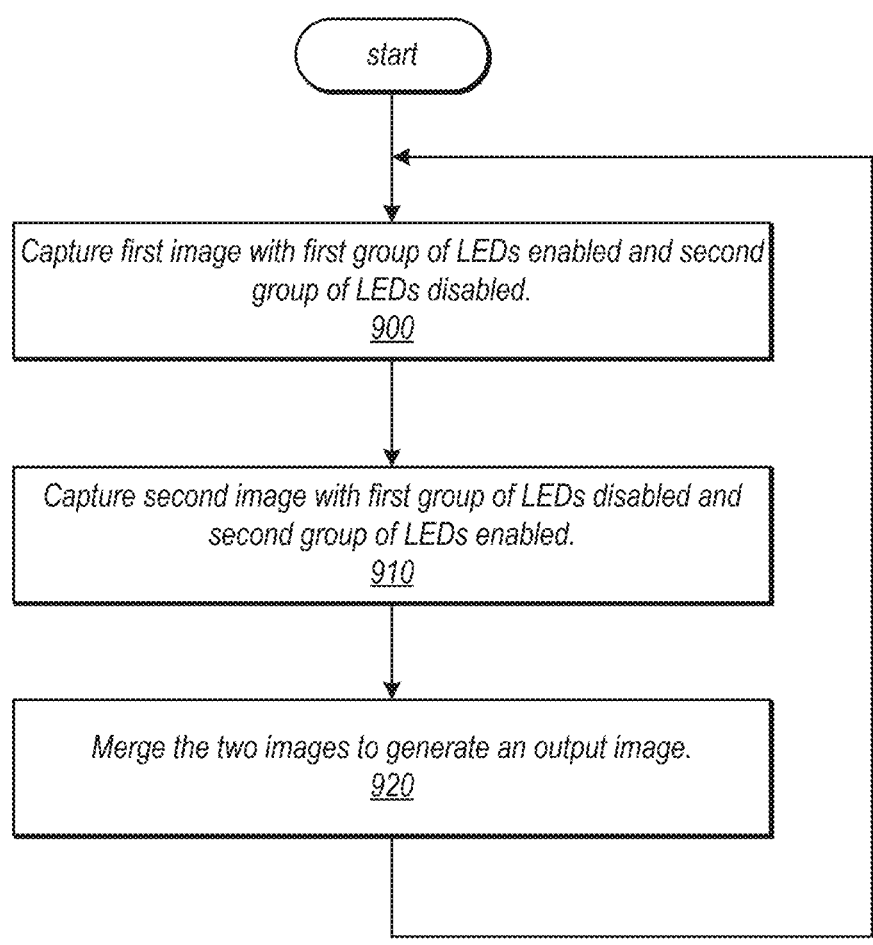
FIG. 9 is a high-level flowchart of a method for mitigating occlusions in an output image, according to some embodiments.

FIG. 9 is a high-level flowchart of a method for mitigating occlusions in an output image, according to some embodiments. As indicated at 900, a first image or sub-frame may be captured with a first group of LEDs enabled and a second group of LEDs disabled. As indicated at 910, a second image or sub-frame may be captured with the first group of LEDs disabled and the second group of LEDs enabled. As indicated at 930, the two sub-frames may then be processed and merged to generate an output image in which the occlusions have been mitigated.

Figure 4:
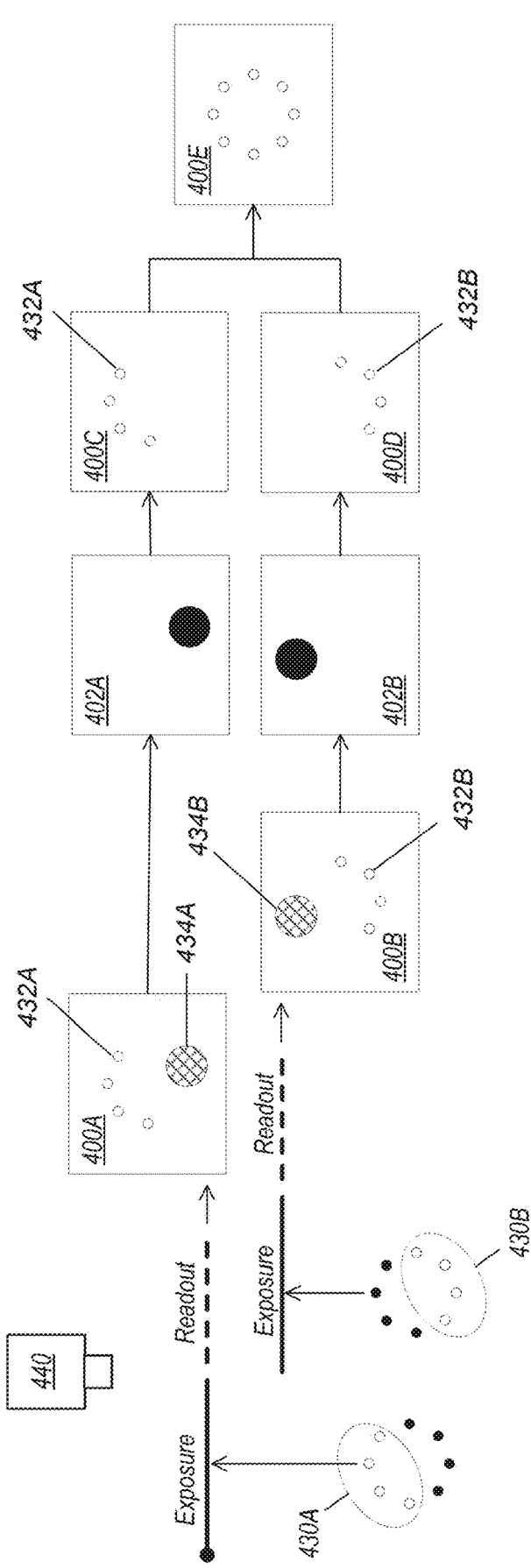
FIG. 4 illustrates using pre-generated masks to generate an output image without occlusions, according to some embodiments.

FIG. 4 illustrates using pre-generated masks to generate an output image without occlusions, according to some embodiments. The illuminators (e.g., LEDs) are divided into two or more groups. In this example, two groups 430A and 430B with four LEDs in each group are shown.

A first group 430A of LEDs illuminates the eye, and a sensor of camera 440 captures a first image 400A of the eye, during a first exposure period. The captured image 400A is read out from the camera 440 sensor during a first readout period. The captured image 400A includes reflections (also referred to as glints) 432A of the point light sources (LEDs) in group 430A. The captured image 400A may also include artifacts 434A resulting from unwanted reflections of the LEDs in group 430A. After image 400A is captured during the first exposure period, the first group 430A of LEDs is disabled and a second group 430B is enabled to illuminate the eye, and the sensor of camera 440 captures a second image 400B of the eye, during a second exposure period. The captured image 400B is read out from the camera 440 sensor during a second readout period. The captured image 400B includes reflections (also referred to as glints) 432B of the point light sources (LEDs) in group 430B. The captured image 400B may also include artifacts 434B resulting from unwanted reflections of the LEDs in group 430B. Note that the second exposure period may at least partially overlap with the first readout period. Images 400A and 400B may be referred to as sub-frames.

In some embodiments, occlusion masks 402A and 402B may be generated, for example during a factory calibration process and/or during a startup process for a device that includes the eye tracking system. The masks 402A and 402B may be generated from images captured with the optical system with different groups of the illumination sources activated or deactivated and when the eye is not being imaged. The stray light and reflection artifacts corresponding to the different groups of illuminators (e.g., LEDs) when activated will show in the respective images. These images can then be used to generate occlusion masks 420A and 420B corresponding to respective groups 430A and 430B of the illumination sources.

After images 400A and 400B are captured and read out, occlusion masks 402A and 402B are applied to images 400A and 400B, respectively, to generate masked images 400C and 400D, which may be temporarily stored to a buffer in memory. Masked image 400C includes reflections 432A corresponding to the point light sources (LEDs) in group 430A, and masked image 400D includes reflections 432B corresponding to the point light sources (LEDs) in group 430B. The occlusions 432A and 432B have been removed from images 400C and 400D by applying the respective masks 402A and 402B. The masked images 400C and 400D are then merged or fused to generate an output image 400E with the occlusions or artifacts caused by stray light or reflections mitigated or eliminated. Algorithmically, the masking and merging process may be stated broadly by the following pseudocode:

Buff 1=Func(Mask 1,Sub-frame 1);

Buff 2=Func(Mask 2,Sub-frame 2);

Output image=Buff 1+Buff 2.

In the method for stray light mitigation shown in FIG. 4, because half of the LEDs are used in each sub-frame, the LED pulse width or peak power may be doubled. Additionally, if ½ exposure time is used on each frame, the signal-to-noise ratio (SNR) of each sub-frame may be lower than desired. Depending on the algorithm used to merge the sub-frames, the output image may have an SNR that can match the desired level in the areas that are not occluded in both sub-frames, and may have lower (e.g., 6 dB lower) SNR in the areas that are occluded in either of the two sub-frames.

Figure 10:
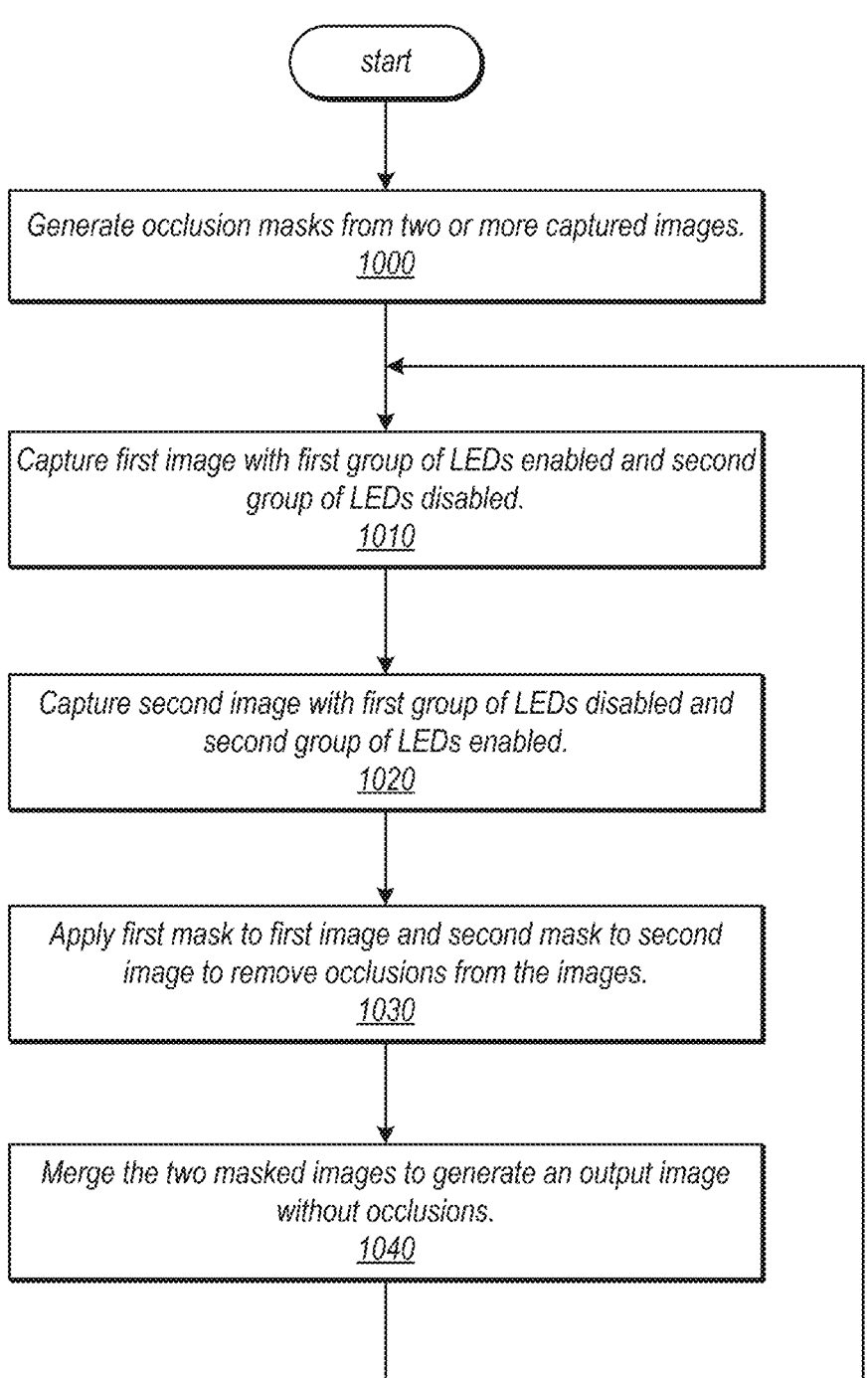
FIG. 10 is a flowchart of a method that uses pre-generated masks to generate an output image without occlusions, according to some embodiments.

FIG. 10 is a flowchart of a method that uses pre-generated masks to generate an output image without occlusions, according to some embodiments. As indicated at 1000, occlusion masks may be generated from two or more captured images. In some embodiments, occlusion masks may be generated, for example during a factory calibration process and/or during a startup process for a device that includes the optical system. The masks may be generated from images captured with the optical system with different groups of the illumination sources activated or deactivated and when the object (e.g., eye) is not being imaged. The stray light and reflection artifacts corresponding to the different groups of illuminators (e.g., LEDs) when activated will show in the respective images. These images can then be used to generate occlusion masks corresponding to respective groups of the illumination sources.

As indicated at 1010, a first image or sub-frame is captured with a first group of LEDs enabled and a second group of LEDs disabled. As indicated at 1020, a second image or sub-frame is captured with the first group of LEDs disabled and the second group of LEDs enabled. As indicated at 1030, a first mask is applied to the first image and a second mask to the second image to remove occlusions from the images. As indicated at 1040, the two masked images or sub-frames may be merged or "fused" to generate an output image without occlusions. As shown by the arrow returning from element 1040 to element 1010, the method of capturing and processing images may be repeated, for example at a desired frame rate, for example at a frame rate of an eye tracking system.

A non-limiting example application of the output images is in eye tracking systems that include at least one eye tracking camera (e.g., infrared (IR) cameras) positioned at each side of the user's face, and an illumination source (e.g., point light sources such as an array or ring of IR light-emitting diodes (LEDs)) that emit light towards the user's eyes. Sub-frames captured by the eye tracking camera may be processed by a controller to generate the output images, which may then be processed by algorithms on the controller, for example to compute gaze direction and a visual axis using glints and eye features based on a three-dimensional (3D) geometric model of the eye.

Figure 5A:
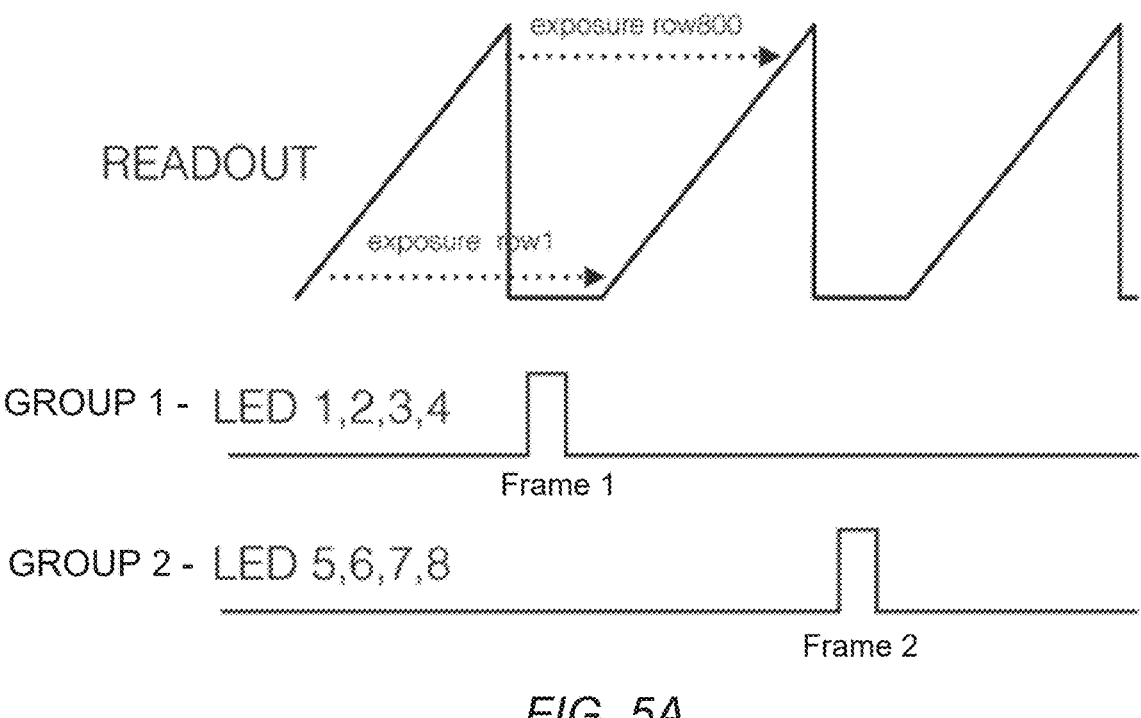
FIGS. 5A and 5B illustrate removing glints from an image using a 2x frame rate rolling shutter (RS) sensor, according to some embodiments.
Figure 5B:
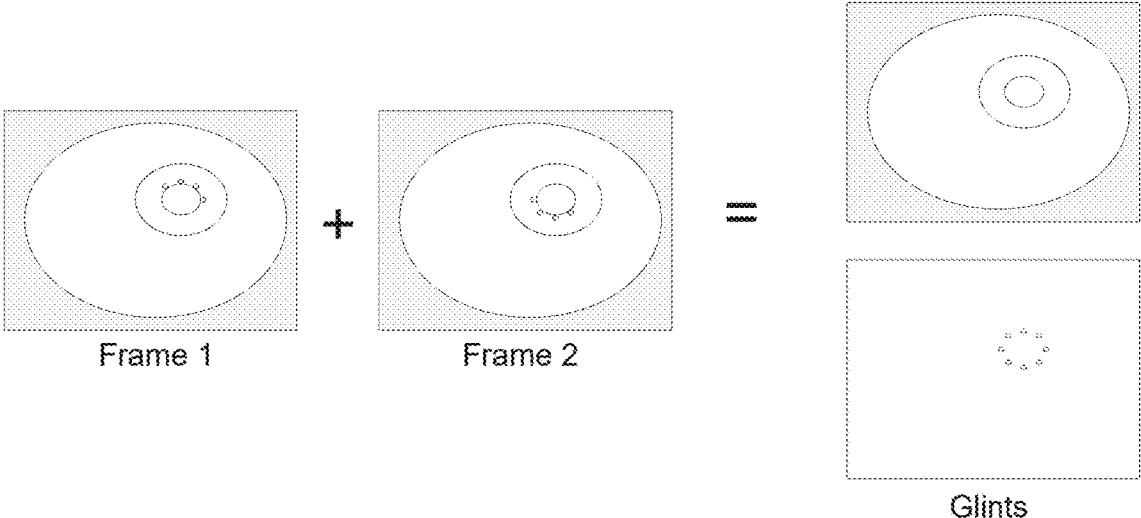

While FIG. 10 describes using two groups of LEDs to capture two sub-frames that are then masked and merged, in some embodiments more than two groups (N groups) of LEDs may be used to capture N sub-frames that are then masked and merged FIGS. 5A and 5B illustrate removing glints from an image using a 2x frame rate rolling shutter (RS) sensor, according to some embodiments. FIG. 5A shows exposure and readout cycles for an RS sensor corresponding to pulses from two groups of LEDs. In some embodiments, by running the frame camera at 2× rate, it is possible to duty cycle the LEDs and process out glints/ghosts from other information on the two frames to generate a grayscale image of the eye and an image containing the glints corresponding to the LEDs, as shown in FIG. 5B. Referring to FIG. 5A, for an RS sensor, the LEDs may be fired during the vertical blanking, and the ambient light may need to be minimal (e.g., <0.1% of peak LED light). In some embodiments, the RS sensor may need to run fast enough to allow ~1 ms vertical blanking at 240 fps. For example, with a 1 ms LED pulse, the camera should be able to run at an equivalent 316 fps. In some environments, for example indoor environments, ambient light at the wavelengths of interest may be negligible compared to the active illumination. However, this may not work in other environments, for example outdoors in sunlight.

Figure 6A:
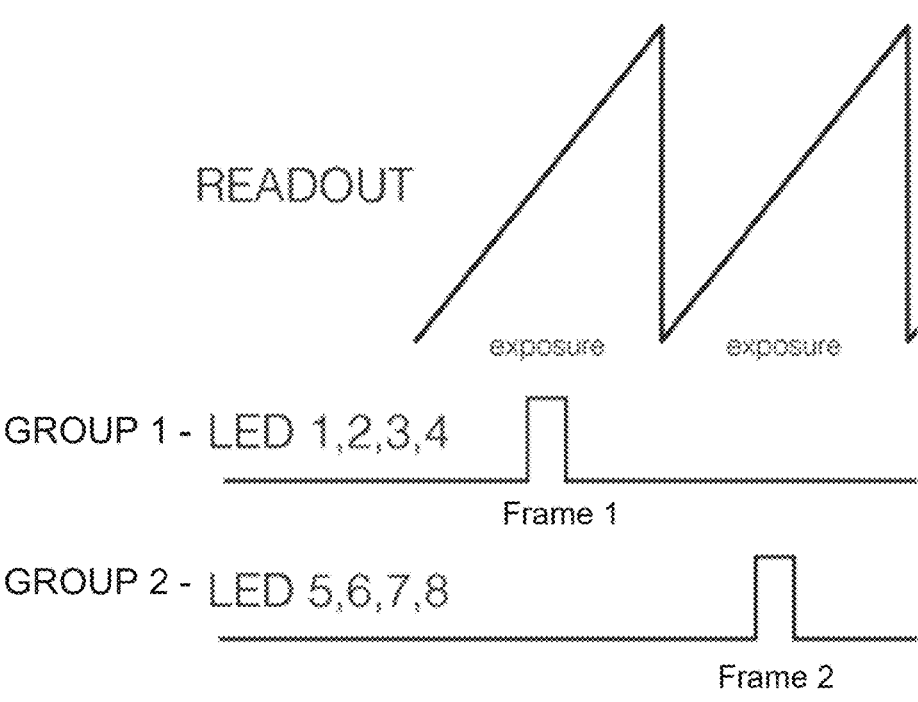
FIGS. 6A and 6B illustrate removing glints from an image using a global shutter (GS) sensor, according to some embodiments.
Figure 6B:
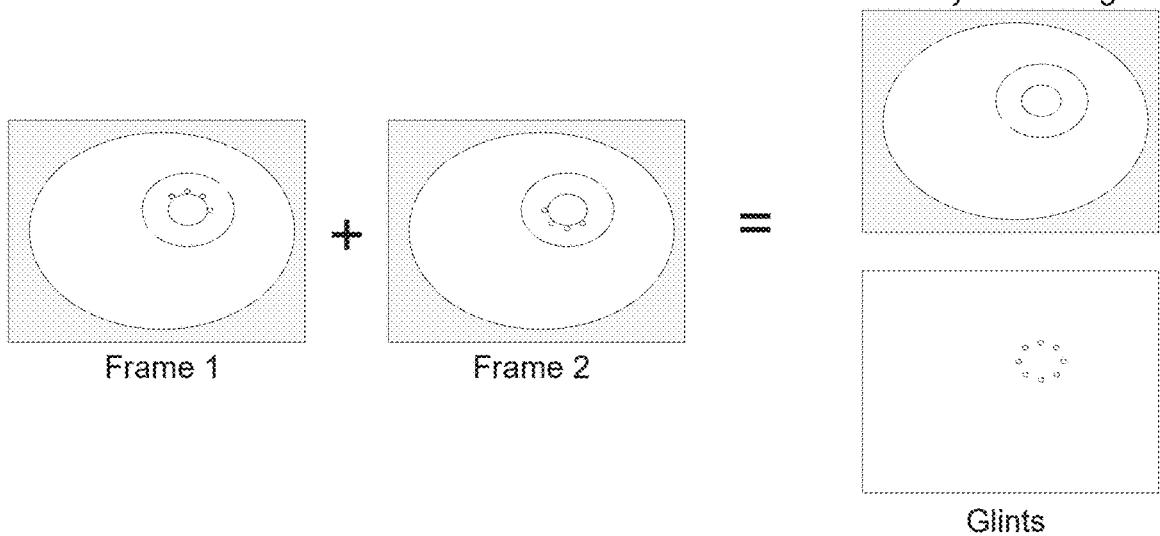

FIGS. 6A and 6B illustrate removing glints from an image using a global shutter (GS) sensor, according to some embodiments. This method may work better than the method shown in FIGS. 5A and 5B in some environments, for example outdoors in sunlight. FIG. 6A shows exposure and readout cycles for GS sensor corresponding to pulses from two groups of LEDs. This method duty cycles the LEDs and processes out glints from the sum of two frames by running the frame camera at 2× rate to generate a grayscale image of the eye and an image containing the glints corresponding to the LEDs, as shown in FIG. 6B.

Figures 7A, 7B, 7C:
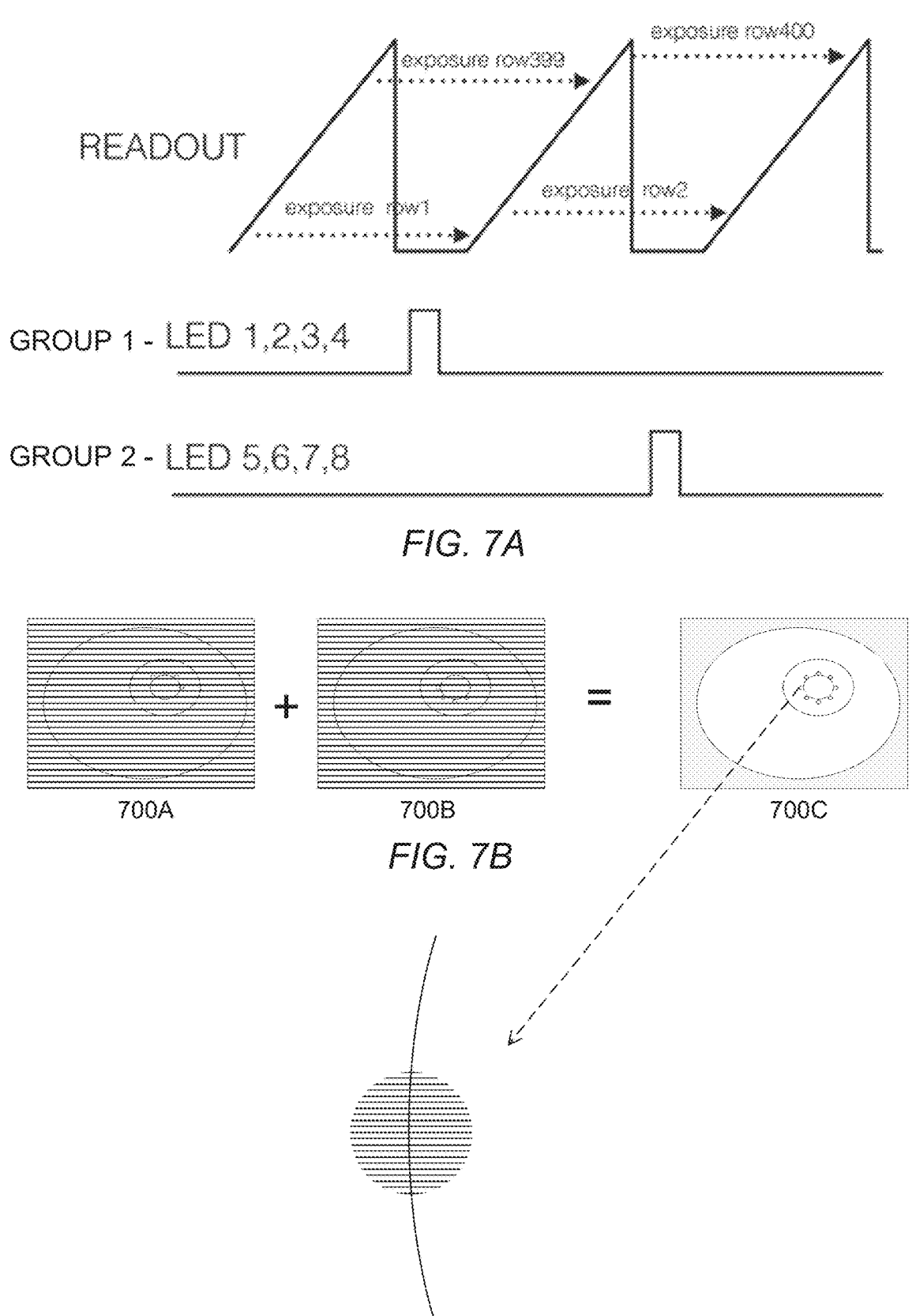
FIGS. 7A through 7C illustrate mitigating occlusions with an interleaved RS sensor, according to some embodiments.

FIGS. 7A through 7C illustrate mitigating occlusions with an interleaved RS sensor, according to some embodiments. FIG. 7A shows exposure and readout cycles for an RS sensor corresponding to pulses from two groups of LEDs. As shown in FIG. 7B, as an alternative to the method shown in FIG. 4, in some embodiments, a rolling shutter (RS) sensor may be used in interleave mode to capture a first image or sub-frame 700A containing odd-numbered rows with a first group of illumination sources (e.g., point light sources such as LEDs) enabled and a second group of illumination sources disabled. A second image or sub-frame 700B is captured containing even-numbered rows with the first group of illumination sources disabled and the second group of illumination sources enabled. The two sub-frames 700A and 700B can then be merged to generate an output image 700C that contains the odd-numbered rows from sub-frame 700A and the even-numbered rows from sub-frame 700B. Glints, stray light reflections, and features of the object appear on alternating rows of the output image, as shown by FIG. 7C. Using this method, the glints and ghosts will look like stripes, and may be less of a noise concern.

Figure 11:
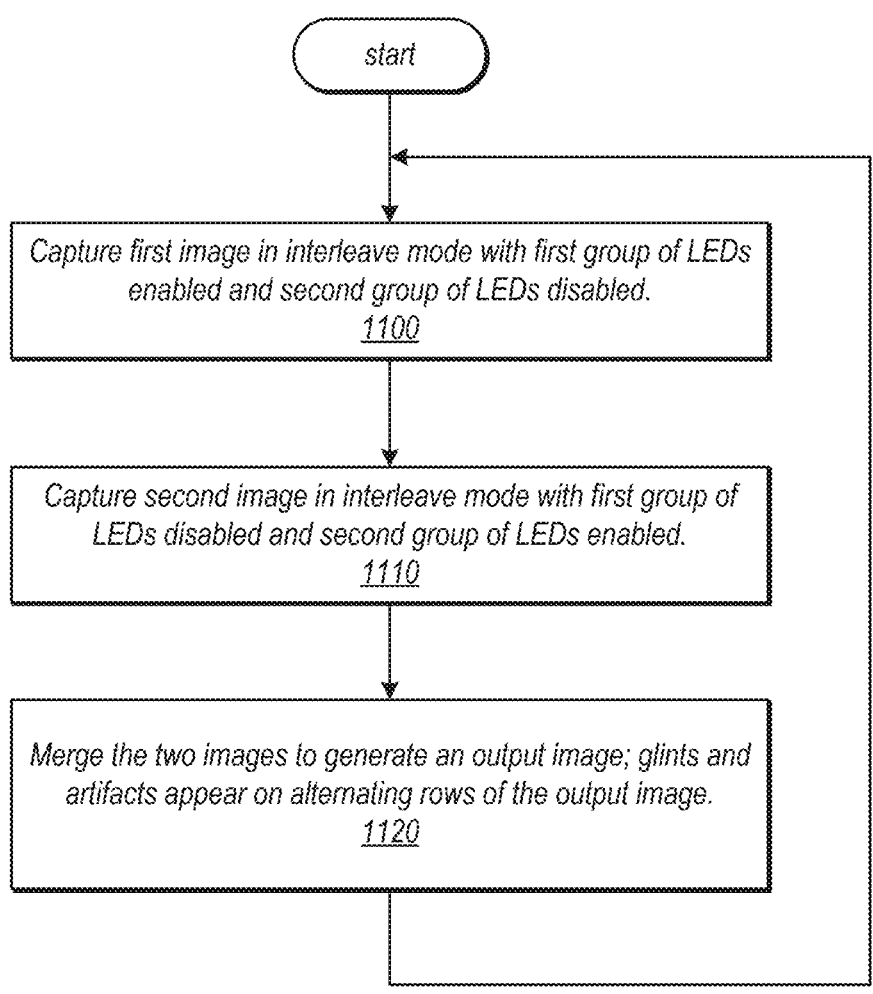
FIG. 11 is a flowchart of a method for mitigating occlusions in an output image using interleaved images captured with an RS sensor, according to some embodiments.

FIG. 11 is a flowchart of a method for mitigating occlusions in an output image using interleaved images captured with an RS sensor, according to some embodiments. As indicated at 1100, a first image or sub-frame is captured in interleave mode with a first group of LEDs enabled and a second group of LEDs disabled. As indicated at 1110, a second image or sub-frame is captured in interleave mode with the first group of LEDs disabled and the second group of LEDs enabled. As indicated at 1120, the two sub-frames are merged to generate an output image. Glints and artifacts appear on alternating rows of the output image. As shown by the arrow returning from element 1120 to element 1100, the method of capturing and processing images may be repeated, for example at a desired frame rate, for example at a frame rate of an eye tracking system.

A non-limiting example application of the output images is in eye tracking systems that include at least one eye tracking camera (e.g., infrared (IR) cameras) positioned at each side of the user's face, and an illumination source (e.g., point light sources such as an array or ring of IR light-emitting diodes (LEDs)) that emit light towards the user's eyes. The output images may be processed by algorithms on the controller, for example to compute gaze direction and a visual axis using glints and eye features based on a three-dimensional (3D) geometric model of the eye.

Figure 8A:
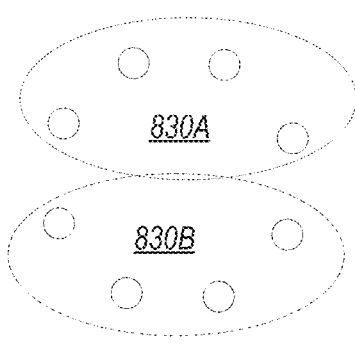
FIGS. 8A through 8C illustrate example groups of illuminators in an eye tracking system, according to some embodiments.
Figure 8B:
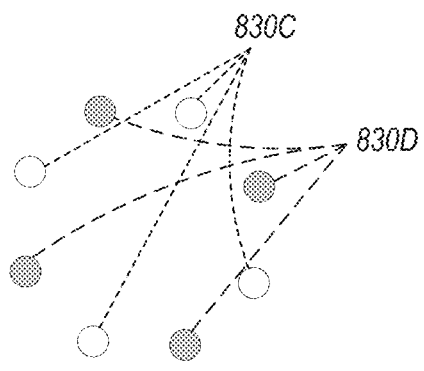
Figure 8C:
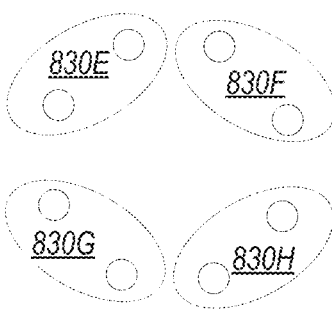

FIGS. 8A through 8C illustrate example groups of illuminators in an eye tracking system, according to some embodiments. FIGS. 8A through 8C show an illumination source that includes a ring of eight point light sources (e.g. LEDs). Note, however, that more or fewer point light sources may be used, and the point light sources may be arranged in other shapes (e.g., oval or square). As previously mentioned, the point light sources (e.g., LEDs) may be divided into two or more groups that may be fired independently in exposure cycles to generate multiple sub-frames that can then be processed and merged. FIG. 8A shows the point light sources arranged in a top group 830A and bottom group 830B. FIG. 8B shows the point light sources arranged into two groups 830C and 830D that include alternate ones of the point light sources. FIG. 8C shows the point light sources arranged into four groups 830E, 830F, 830G, and 830H.

Example Systems

Figures 12A, 12B:
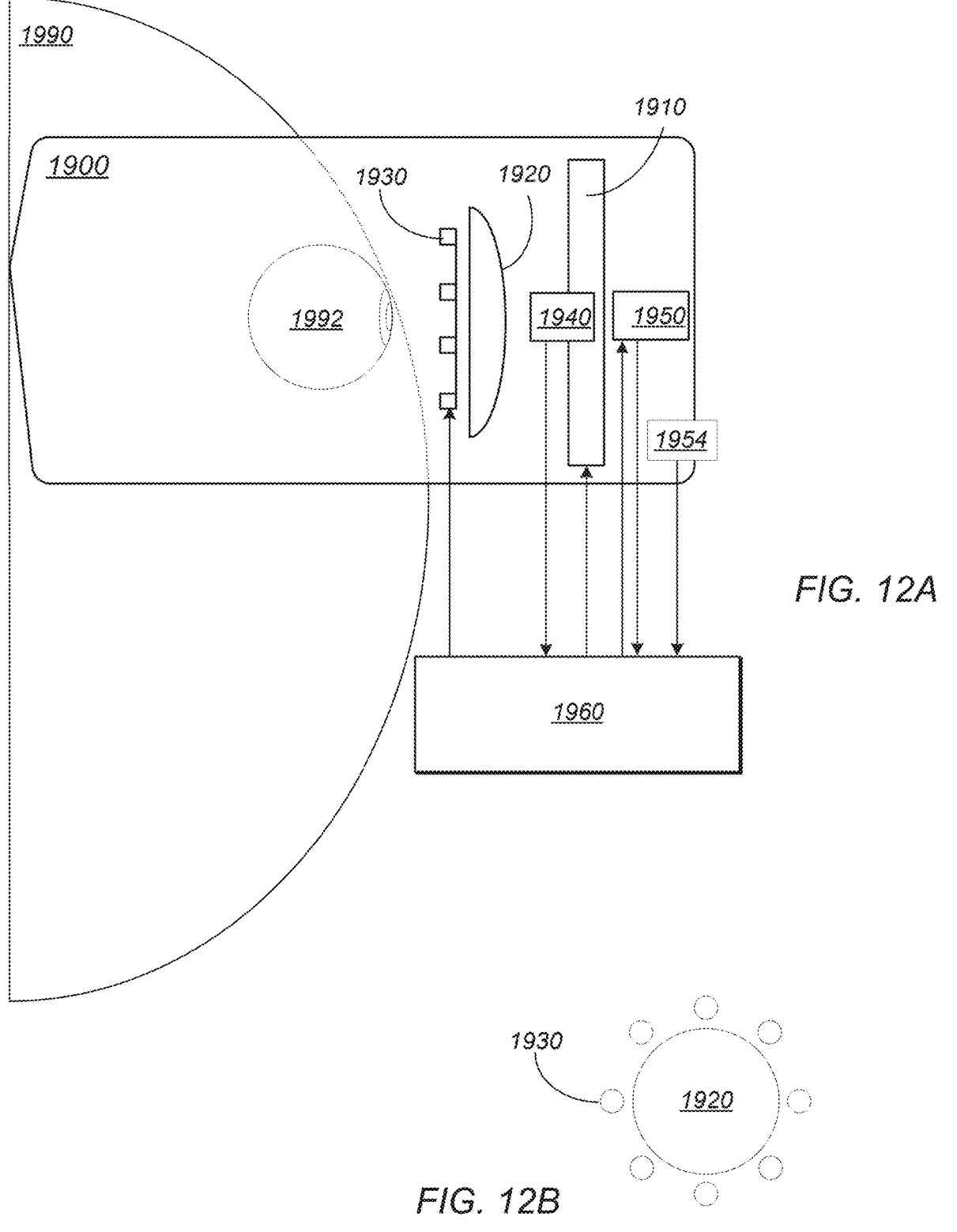
FIGS. 12A and 12B illustrate an example head-mounted device (HMD) that may include components and implement methods as illustrated in FIGS. 1 through 11, according to some embodiments.

FIGS. 12A and 12B illustrate an example video pass-through head-mounted device (HMD) in an extended reality (XR) system that may include components and implement methods as illustrated in FIGS. 1 through 11, according to some embodiments. Note that HMD 1900 as illustrated in FIGS. 12A and 12B is given by way of example, and is not intended to be limiting. In various embodiments, the shape, size, and other features of an HMD 1900 may differ, and the locations, numbers, types, and other features of the components of an HMD 1900 may vary. HMD 1900 may include, but is not limited to, a display 1910 and two optical lenses (eyepieces) 1920, mounted in a wearable housing or frame. As shown in FIG. 12A, HMD 1900 may be positioned on the user's head 1990 such that the display 1910 and eyepieces 1920 are disposed in front of the user's eyes 1992. The user looks through the eyepieces 1920 onto the display 1910. HMD 1900 may also include sensors that collect information about the user's environment (video, depth information, lighting information, etc.) and about the user (e.g., eye tracking sensors). The sensors may include, but are not limited to one or more eye tracking cameras 1940 (e.g., infrared (IR) cameras) that capture views of the user's eyes 1992, one or more scene (visible light) cameras 1950 (e.g., RGB video cameras) that capture images of the real world environment in a field of view in front of the user, and one or more ambient light sensors 1954 that capture lighting information for the environment.

Figure 13:
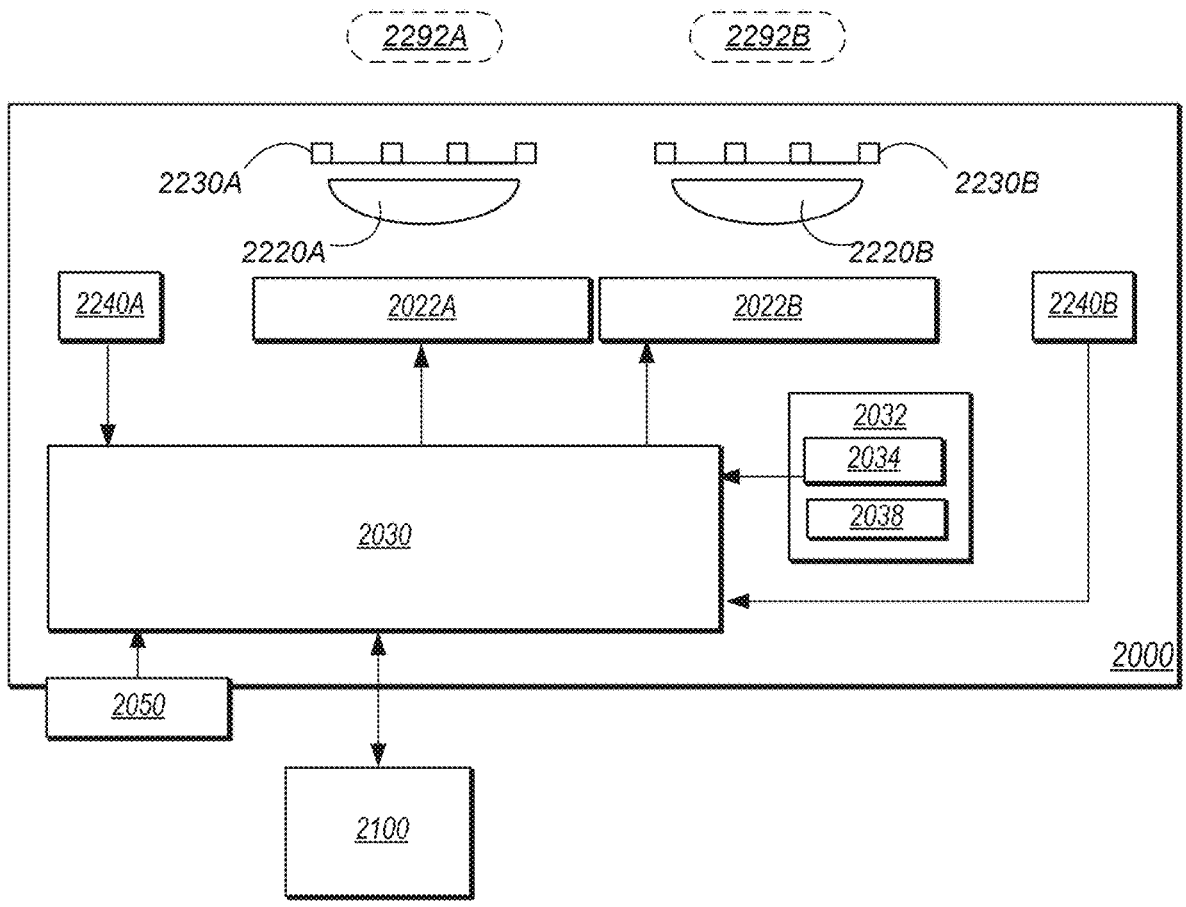
FIG. 13 is a block diagram illustrating an example system that may include components and implement methods as illustrated in FIGS. 1 through 11, according to some embodiments.

A controller 1960 for the MR system may be implemented in the HMD 1900, or alternatively may be implemented at least in part by an external device (e.g., a computing system) that is communicatively coupled to HMD 1900 via a wired or wireless interface. Controller 1960 may include one or more of various types of processors, image signal processors (ISPs), graphics processing units (GPUs), coder/decoders (codecs), and/or other components for processing and rendering video and/or images. Controller 1960 may render frames (each frame including a left and right image) that include virtual content based at least in part on inputs obtained from the sensors 1940, 1950, and 1954, and may provide the frames to display 1910. FIG. 13 further illustrates components of an HMD and MR system, according to some embodiments.

In some embodiments, an eye tracking system for the MR system may include, but is not limited to, one or more eye tracking cameras 1940 and an IR light source 1930. IR light source 1930 (e.g., IR LEDs) may be positioned in the HMD 1900 (e.g., around the eyepieces 1920 as shown in FIG. 13B, or elsewhere in the HMD 1900) to illuminate the user's eyes 1992 with IR light. At least one eye tracking camera 1940 (e.g., an IR camera, for example a 400×400 pixel count camera or a 600×600 pixel count camera, that operates at 850 nm or 940 nm, or at some other IR wavelength, and that captures frames, for example at a rate of 60-120 frames per second (FPS)), is located at each side of the user 1990's face. In various embodiments, the eye tracking cameras 1940 may be positioned in the HMD 1900 on each side of the user 1990's face to provide a direct view of the eyes 1992, a view of the eyes 1992 through the eyepieces 1920, or a view of the eyes 1992 via reflection off hot mirrors or other reflective components. Note that the location and angle of eye tracking camera 1940 is given by way of example, and is not intended to be limiting. While FIG. 12A shows a single eye tracking camera 1940 located on each side of the user 1990's face, in some embodiments there may be two or more eye tracking cameras 1940 on each side of the user 1990's face.

A portion of IR light emitted by light source(s) 1930 reflects off the user 1990's eyes and is captured by the eye tracking cameras 1940 to image the user's eyes 1992. Images captured by the eye tracking cameras 1940 may be analyzed by controller 1960 to detect features (e.g., pupil), position, and movement of the user's eyes 1992, and/or to detect other information about the eyes 1992 such as pupil dilation. For example, the point of gaze on the display 1910 may be estimated from the eye tracking; the estimated point of gaze may be used to cause the scene camera(s) 1950 of the HMD 1900 to expose images of a scene based on a region of interest (ROI) corresponding to the point of gaze As another example, the estimated point of gaze may enable gaze-based interaction with content shown on the display 1910. As another example, in some embodiments, brightness of the displayed images may be modulated based on the user's pupil dilation as determined by the eye tracking system. The eye tracking system of the HMD 1900 may implement one or more of the methods for stray light mitigation as illustrated in FIGS. FIGS. 4 through 11 to capture and process images of the user's eyes 1992.

Embodiments of an HMD 1900 as illustrated in FIGS. 12A and 12B may, for example, be used in XR applications to provide augmented or mixed reality views to the user 1990. HMD 1900 may include one or more sensors, for example located on external surfaces of the HMD 1900, which collect information about the user 1990's external environment (video, depth information, lighting information, etc.); the sensors may provide the collected information to controller 1960 of the MR system. The sensors may include one or more visible light cameras 1950 (e.g., RGB video cameras) that capture video of the user's environment that may be used to provide the user 1990 with a virtual view of their real environment. In some embodiments, video streams of the real environment captured by the visible light cameras 1950 may be processed by the controller 1960 of the HMD 1900 to render augmented or mixed reality frames that include virtual content overlaid on the view of the real environment, and the rendered frames may be provided to display 1910.

FIG. 13 is a block diagram illustrating an example MR system that may include components and implement methods as illustrated in FIGS. 1 through 11, according to some embodiments. In some embodiments, a MR system may include an HMD 2000 such as a headset, helmet, goggles, or glasses. HMD 2000 may implement any of various types of display technologies. For example, the HMD 2000 may include a display system that displays frames including left and right images on screens or displays 2022A and 2022B that are viewed by a user through eyepieces 2220A and 2220B. The display system may, for example, be a DLP (digital light processing), LCD (liquid crystal display), or LCOS (liquid crystal on silicon) technology display system. To create a three-dimensional (3D) effect in a 3D virtual view, objects at different depths or distances in the two images may be shifted left or right as a function of the triangulation of distance, with nearer objects shifted more than more distant objects. Note that other types of display systems may be used in some embodiments.

In some embodiments, HMD 2000 may include a controller 2030 configured to implement functionality of the MR system and to generate frames (each frame including a left and right image) that are provided to displays 2022A and 2022B. In some embodiments, HMD 2000 may also include a memory 2032 configured to store software (code 2034) of the MR system that is executable by the controller 2030, as well as data 2038 that may be used by the MR system when executing on the controller 2030. In some embodiments, HMD 2000 may also include one or more interfaces (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors 2050 that collect information about the user's environment (video, depth information, lighting information, etc.). The sensors 2050 may provide the information to the controller 2030 of the MR system. In some embodiments, sensors 2050 may include, but are not limited to, visible light cameras (e.g., video cameras) and ambient light sensors.

HMD 2000 may be positioned on the user's head such that the displays 2022A and 2022B and eyepieces 2220A and 2220B are disposed in front of the user's eyes 2292A and 2292B. IR light sources 2230A and 2230B (e.g., IR LEDs) may be positioned in the HMD 2000 (e.g., around the eyepieces 2220A and 2220B, or elsewhere in the HMD 2000) to illuminate the user's eyes 2292A and 2292B with IR light. Eye tracking cameras 2240A and 2240B (e.g., IR cameras, for example 400×400 pixel count cameras or 600×600 pixel count cameras that operate at 850 nm or 940 nm, or at some other IR wavelength, and that capture frames, for example at a rate of 60-120 frames per second (FPS)), are located at each side of the user's face. In various embodiments, the eye tracking cameras 2240 may be positioned in the HMD 2000 to provide a direct view of the eyes 2292, a view of the eyes 2292 through the eyepieces 2220, or a view of the eyes 2292 via reflection off hot mirrors or other reflective components. Note that the location and angle of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR light emitted by light sources 2230A and 2230B reflects off the user's eyes 2292A and 2292B is received at respective eye tracking cameras 2240A and 2240B, and is captured by the eye tracking cameras 2240A and 2240B to image the user's eyes 2292A and 2292B. Eye tracking information captured by the cameras 2240A and 2240B may be provided to the controller 2030. The controller 2030 may analyze the eye tracking information (e.g., images of the user's eyes 2292A and 2292B) to determine eye position and movement and/or other features of the eyes 2292A and 2292B. In some embodiments, to accurately determine the location of the user's eyes 2292A and 2292B with respect to the eye tracking cameras 2240A and 2240B, the controller 2030 may perform a 3D reconstruction using images captured by the eye tracking cameras 2240A and 2240B to generate 3D models of the user's eyes 2292A and 2292B. The 3D models of the eyes 2292A and 2292B indicate the 3D position of the eyes 2292A and 2292B with respect to the eye tracking cameras 2240A and 2240, which allows the eye tracking algorithms executed by the controller to accurately track eye movement. The eye tracking system of the HMD 2000 may implement one or more of the methods for stray light mitigation as illustrated in FIGS. FIGS. 4 through 11 to capture and process images of the user's eyes 1992.

The eye tracking information obtained and analyzed by the controller 2030 may be used by the controller in performing various XR system functions. For example, the point of gaze on the displays 2022A and 2022B may be estimated from images captured by the eye tracking cameras 2240A and 2240B; the estimated point of gaze may be used to cause the scene camera(s) of the HMD 2000 to expose images of a scene based on a region of interest (ROI) corresponding to the point of gaze. As another example, the estimated point of gaze may enable gaze-based interaction with virtual content shown on the displays 2022A and 2022B. As another example, in some embodiments, brightness of the displayed images may be modulated based on the user's pupil dilation as determined by the eye tracking system.

In some embodiments, the HMD 2000 may be configured to render and display frames to provide an XR view for the user based at least in part according to sensor 2050 inputs. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by MR system and composited with the displayed view of the user's real environment.

Embodiments of the HMD 2000 as illustrated in FIG. 13 may also be used in XR applications to provide virtual reality views to the user. In these embodiments, the controller 2030 of the HMD 2000 may render or obtain frames that include virtual content, and the rendered frames may be displayed to provide a virtual reality (as opposed to augmented or mixed reality) experience to the user. In these systems, rendering of the frames may be affected based on the point of gaze determined from the eye tracking system.

A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. An extended reality (XR) environment, on the other hand, refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a camera;
two or more illumination sources, wherein the two or more illumination sources are grouped into N groups, wherein individual ones of the groups contain at least one of the illumination sources, and wherein individual ones of the groups are configured to be activated independently of the other groups to emit light towards an object to be imaged by the camera;
wherein the camera is configured to capture N sub-frames of the object, wherein individual ones of sub-frames are illuminated by a respective one of the N groups of illumination sources that is activated during the capture, wherein different ones of the sub-frames are illuminated by different combinations of activated and deactivated illumination sources; and
a controller comprising one or more processors configured to process and merge the N sub-frames to generate an output image of the object, wherein processing and merging the N sub-frames mitigates or eliminates artifacts in the N-sub-frames caused by stray light in the system, and wherein the output image of the object comprises at least a portion of the individual ones of the sub-frames.

2. The system as recited in claim 1, wherein the stray light includes reflections of the light emitted by the illumination sources off of components of the system.

3. The system as recited in claim 1, wherein the illumination sources are light-emitting diodes (LEDs).

4. The system as recited in claim 1, wherein the illumination sources are infrared (IR) light sources, and wherein the camera is an infrared camera.

5. The system as recited in claim 1, wherein, to process and merge the N sub-frames to generate the output image of the object, the controller is further configured to:
apply respective masks to individual ones of the N sub-frames to generate N masked sub-frames, wherein applying a respective mask to a sub-frame mitigates or eliminates artifacts in the sub-frame caused by the respective group of illumination sources; and
merge the N masked sub-frames to generate the output image of the object.

6. The system as recited in claim 5, wherein the masks are generated from images captured by the camera with respective ones of the groups of illumination sources activated and when the object is not being imaged.

7. The system as recited in claim 1, wherein the camera includes a rolling shutter (RS) sensor, wherein there are two groups of illumination sources, and
wherein the camera is configured to:
capture a first sub-frame in interleave mode with a first group of illumination sources activated and a second group of illuminators deactivated, wherein the first sub-frame includes odd rows from the sensor;
capture a second sub-frame in interleave mode with the first group of illumination sources deactivated and the second group of illuminators activated, wherein the second sub-frame includes even rows from the sensor; and
wherein, to process and merge the N sub-frames to generate the output image of the object, the controller is configured to merge the two sub-frames to generate the output image.

8. The system as recited in claim 1, wherein the system is an eye tracking system, and wherein the object is an eye.

9. The system as recited in claim 8, wherein individual ones of the N sub-frames include one or more glints corresponding to reflections of the illumination sources off of the eye, and wherein the output image includes the glints from the N sub-frames.

10. The system as recited in claim 8, wherein the eye tracking system is a component of a head-mounted device (HMD) comprising at least one display screen.

11. The system as recited in claim 10, wherein the HMD further comprises left and right optical lenses located between the at least one display screen and a user's eyes.

12. The system as recited in claim 10, wherein the HMD is a component of an extended reality (XR) system.

13. A method, comprising:
activating a first group of illumination sources to illuminate an object, wherein a second group of illumination sources is deactivated;
capturing, by a camera, a first image of the object illuminated by the first group of illumination sources;
activating the second group of illumination sources to illuminate the object, wherein the first group of illumination sources is deactivated;
capturing, by the camera, a second image of the object illuminated by the second group of illumination sources; and
merging, by a controller comprising one or more processors, the first and second images to generate an output image of the object, wherein merging the first and second images mitigates or eliminates artifacts in the first and second images caused by stray light, and wherein the output image of the object comprises at least a portion of the first image and at least a portion of the second image.

14. The method as recited in claim 13, wherein the stray light includes reflections of the light emitted by the illumination sources off of components of a system that includes the illumination sources and the camera.

15. The method as recited in claim 13, wherein merging the first and second images to generate the output image of the object comprises:
applying respective masks to the first and second images to generate first and second masked images, wherein applying a respective mask to an image mitigates or eliminates artifacts in the image caused by the respective group of illumination sources; and
merging the first and second masked images to generate the output image of the object.

16. The method as recited in claim 15, further comprising, prior to said activating and capturing, generating the first and second masks from images captured by the camera with the respective groups of illumination sources activated and when the object is not being imaged.

17. The method as recited in claim 13, wherein the camera includes a rolling shutter (RS) sensor, wherein there are two groups of illumination sources,
wherein the camera captures the first image in interleave mode with the first group of illumination sources activated and the second group of illuminators deactivated, wherein the first image includes odd rows from the sensor; and
wherein the camera captures the second image in interleave mode with the first group of illumination sources deactivated and the second group of illuminators activated, wherein the second image includes even rows from the sensor.

18. The method as recited in claim 13, wherein the illumination sources and camera are components of an eye tracking system, and wherein the object is an eye.

19. The method as recited in claim 18, wherein the first image includes one or more glints corresponding to reflections of the illumination sources in the first group off of the eye, wherein the second image includes one or more glints corresponding to reflections of the illumination sources in the second group off of the eye, and wherein the output image includes the glints from both the first and second images.

20. The method as recited in claim 18, wherein the eye tracking system is a component of a head-mounted device (HMD).

* * * * *